US008996722B2

(12) United States Patent
Lakshman et al.

(10) Patent No.: US 8,996,722 B2
(45) Date of Patent: Mar. 31, 2015

(54) SOFTROUTER FEATURE SERVER

(75) Inventors: Tirunell V. Lakshman, Morganville, NJ (US); Krishan K. Sabnani, Westfield, NJ (US); Thomas Y. Woo, Red Bank, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 1999 days.

(21) Appl. No.: 11/147,768

(22) Filed: Jun. 8, 2005

(65) Prior Publication Data

US 2006/0092935 A1 May 4, 2006

Related U.S. Application Data

(60) Provisional application No. 60/623,885, filed on Nov. 1, 2004.

(51) Int. Cl.
*G06F 15/173* (2006.01)
*H04L 12/701* (2013.01)
*H04L 12/931* (2013.01)

(52) U.S. Cl.
CPC .............. *H04L 45/00* (2013.01); *H04L 49/602* (2013.01)
USPC ........... 709/238; 709/249; 370/219; 370/254; 370/438; 370/466

(58) Field of Classification Search
USPC ....................................................... 709/238
See application file for complete search history.

(56) References Cited

U.S. PATENT DOCUMENTS 6,304,568 B1 * 10/2001 Kim .............................. 370/387
6,633,560 B1   10/2003 Albert et al.
6,912,197 B2   6/2005 Mahamuni
6,999,454 B1 * 2/2006 Crump ........................ 370/389
7,069,343 B2   6/2006 Goringe et al.
7,075,904 B1   7/2006 Manish et al.
(Continued)

FOREIGN PATENT DOCUMENTS

EP    1 152 631 A2    11/2001
EP    1 156 629 A1    11/2001
EP    05 25 6618      12/2005

OTHER PUBLICATIONS

Louati W et al: "Configurable software-based edge router architecture" Applications and Services in Wireless Networks, 2004. ASWN 2004. 2004 $4^{TH}$ Workshop on Boston, MA, USA Aug. 9-11, 2004, Piscataway, NJ, USA, IEEE, Aug. 9, 2004, pp. 169-173, XP010802367 ISBN: 0-7803-8960-3.
(Continued)

*Primary Examiner* — Hua Fan
(74) *Attorney, Agent, or Firm* — Wall & Tong LLP

(57) ABSTRACT

A network architecture includes one or more feature servers and control servers in a control plane that is logically separate from a data plane that includes forwarding elements. Feature servers facilitate adding network-based functionality in a centralized way that is has better scalability than the traditional router architecture. Some examples of network-based functionality are voice over IP, enhancing QoS support, scaling BGP route reflectors, network-based VPN support, scaling mobile IP support, introducing IPv6 into existing and future networks, and enhancing end-to-end network security. Feature servers remove complexity from routers, allow functions to be implemented on a standard-off-the-shelf server platform, facilitate easy introduction of value-added functions, and scale well.

25 Claims, 12 Drawing Sheets

(56) References Cited

U.S. PATENT DOCUMENTS

| | | | |
|---|---|---|---|
| 7,190,896 | B1 | 3/2007 | Wang et al. |
| 7,194,653 | B1 | 3/2007 | Hadders et al. |
| 7,224,668 | B1* | 5/2007 | Smethurst et al. ............ 370/229 |
| 7,286,468 | B2 | 10/2007 | Scudder et al. |
| 7,324,439 | B2 | 1/2008 | Loo |
| 7,388,840 | B2* | 6/2008 | Deval et al. .................... 370/237 |
| 7,428,219 | B2 | 9/2008 | Khosravi |
| 2002/0191250 | A1 | 12/2002 | Graves et al. |
| 2003/0028641 | A1 | 2/2003 | Zhang et al. |
| 2003/0069975 | A1 | 4/2003 | Abjanic et al. |
| 2003/0128668 | A1 | 7/2003 | Yavatkar et al. |
| 2003/0208585 | A1 | 11/2003 | Shinomiya et al. |
| 2004/0098505 | A1* | 5/2004 | Clemmensen ................ 709/244 |
| 2004/0100908 | A1* | 5/2004 | Khosravi et al. ............. 370/235 |
| 2004/0131079 | A1 | 7/2004 | Hegde et al. |
| 2004/0264384 | A1* | 12/2004 | Deval et al. .................... 370/252 |
| 2005/0050136 | A1 | 3/2005 | Golla |
| 2005/0190783 | A1 | 9/2005 | Khosravi |
| 2005/0254438 | A1 | 11/2005 | Turk et al. |
| 2007/0201357 | A1* | 8/2007 | Smethurst et al. ............ 370/229 |
| 2007/0286185 | A1* | 12/2007 | Eriksson et al. ............. 370/389 |

OTHER PUBLICATIONS

Zao J et al: "Domain Based Internet Security Policy Management" Proceedings DARPA Information Survivability Conference and Exposition, DISCEX, Dec. 31, 1999, pp. 41-53, XP002276485 Chapters 1.2, 2.1, 3.1.

Tall Avian et al: "Active networking on a programmable networking platform" Open Architectures and Network Programming Proceedings, 2001 IEEE Apr. 27-28, 2001, Piscataway, NJ, USA, IEEE, Apr. 27, 2001, pp. 95-103, XP010538885 ISBN: 0-7803-7064-3 Chapters III, IV.

Yang L et al: "RFC 3746: Forwarding and Control Element Separation (ForCES) Framework" Network Working Group, Apr. 2004, XP002323740 Chapters 2 and 3.

A. Lazar, "Programming Telecommunication Networks," IEEE Network, vol. 11, Sep./Oct. 1997, pp. 8-18.

S. Williams, "The Softswitch Advantage," IEE Review, vol. 48, Issue 4, Jul. 2002, pp. 25-29.

J. Rexford et al., "Network-Wide Decision Making: Toward A Wafer-Thin Control Plane," HotNets, 2004.

L. Yang et al., "Forwarding and Control Element Separation (ForCES) Framework," RFC 3746, 2004.

Gopal, Ram, "Seperation of Control and Forwarding Plane Inside a Network Element," High Speed Networks and Multimedia Communications 5$^{th}$ IEEE International Conference. Nov. 7, 2002. pp. 161-166.

Chan, Vien et al., "Control Plane Platform Development Kit (CP-PDK)—Integrating Control Plane and Data Plane," Intel Corporation. Feb. 19, 2003.

R. Gopal et al., "ForwArding and Control ElemenT Protocol (FACT)," Nov. 2003, IETF Draft (draft-gopal-forces-fact-06.txt).

Ansari, Furquan et al., ForCES Element Bindings and Topology Discovery Protocol,: Jul. 10, 2004.

U.S. Appl. No. 11/147,642, published Jun. 8, 2005, Lakshman et al.
U.S. Appl. No. 11/147,472, published Jun. 8, 2005, Ansari et al.
U.S. Appl. No. 11/147,665, published Jun. 8, 2005, Ansari et al.
U.S. Appl. No. 11/147,937, published Jun. 8, 2005, Lakshman et al.
U.S. Appl. No. 11/147,491, published Jun. 8, 2005, Ansari et al.

Forwarding and Control Element Separation (ForCES) Framework, RFC 3746 by Yang et al. Apr. 30, 2004.

L. Yang et al., "Forwarding and control Element Separation (ForCES) Framework", Network Working Group Request for Comments: 3746, Apr. 2004.

Ansari et al., "element Bindings and Topology discovery Protocol—(Slides)".

Lin et al., "Multihop Wireless IEEE 802.11 LANs", 1999 IEEE Int. Conf., vol. 3, pp. 1588-1572.

Ram Gopal, "Seperation of Control and Forwarding Plane Inside a Network Element", 2002 IEEE.

Furquan Ansari et al., "ForCES Element Bindings and Topology Discovery Protocol", Jul. 2004.

V.Chan et al., "Control Plane Platform Development Kit," Intel Developer Forum, Spring 2003.

Tal Lavian et al. "intelligent network services through active flow manipulation" Intelligent Network Workshop, 2001 IEEE May 6-9, 2001, Piscataway, NJ, USA, IEEE, May 6, 2001, pp. 73-82.

"Draft Exploration Party," Computer & Network LAN published by Ohm Publisher, on May 1, 2003, Vool. 21, No. 5, pp. 75-78.

RFC 3654 ForCES Requirements, Khorsavi et al., Nov. 2003, All.

\* cited by examiner

APPLICATIONS

QoS, MULTICAST, MOBILITY, VPN,...

TRANSPORT

TRADITIONAL ROUTER-BASED NETWORK

SOFTROUTER FEATURE SERVER

CROSS-REFERENCES

The present application claims the benefit of provisional application No. 60/623,885, entitled "SoftRouter: Router Disaggregation," filed Nov. 1, 2004. In addition, the present application is related to copending application Ser. No. 11/147,642, entitled "SoftRouter," Ser. No. 11/147,472, entitled "SoftRouter Protocol Disaggregation," Ser. No. 11/147,665, entitled "SoftRouter Protocol Failovers," Ser. No. 11/147,937, entitled "SoftRouter Separate Control Network," Ser. No. 11/147,491, entitled "SoftRouter Dynamic Binding Protocol," which were filed on the same date as the present application, Jun. 8, 2005. The provisional and related applications are incorporated herein by reference in their entireties.

FIELD OF THE INVENTION

The present invention relates generally to the field of networking and, in particular, relates to feature servers and networking applications.

BACKGROUND OF THE INVENTION

Internet protocol (IP) provides end-to-end datagram delivery service to protocols and applications and can use any link-layer technology that delivers packets. FIG. 1 illustrates the problem of emerging applications driving more functions to IP, expanding the "waist" of the hour glass. These emerging applications include email, www phone, simple mail transfer protocol (SMTP), hypertext transfer protocol (HTTP), real time protocol (RTP), transmission control protocol (TCP), user datagram protocol (UDP), and other protocols, which involve quality of service (QoS), multicast, mobility, security, virtual private network (VPN), and other features and are transported using Ethernet, point-to-point protocol (PPP), carrier sense multiple access (CSMA) asynchronous transfer mode (ATM), synchronous optical network (SONET), and other protocols over copper, fiber, radio, and other physical transport means. Conventional routers try to incorporate all of the new IP functions into routers, resulting in duplication of complex functions in multiple routers of a network. This also increases capital and operational expenses.

The demand for new features, such as VPN exceeds or will soon exceed the scalability allowed in conventional networks. Emerging applications, such as voice over IP (VOIP) and IP video are putting more stringent requirements (e.g., reliability) on conventional networks. There is a need for disaggregation of router hardware from router software using open, standards-based protocols for internetworking.

SUMMARY

Various deficiencies of the prior art are addressed by the present invention of feature servers in an exemplary SoftRouter architecture, which has many embodiments.

One embodiment is a network architecture including a plurality of forwarding elements (FEs) at least one control element (CE), and at least one feature server (FS). The FEs forward packets. The CE is in communication with at least a portion of the FEs for controlling and providing routing information to the FEs. The FS implements at least one application and is in communication with the FEs and CE. The CE and FS are logically separate from the FEs.

Another embodiment is a network architecture including a data plane and a control plane. The data plane includes a plurality of forwarding elements (FEs) for packet forwarding. There is at least one control element (CE) for configuring, controlling, and providing routing information to the FEs via a standard protocol. The CE is dynamically bound to the FEs. There is at least one feature server (FS) for adding network-based functionality. The control plane is logically separate from the data plane. The control plane includes the CE and FS.

Yet another embodiment is a network architecture including at least one control element (CE) and at least one feature server (FS). The CE controls and provides routing information to a plurality of forwarding elements (FEs). The FEs forward packets. The FS implements at least one application and is in communication with the FEs and CE. The CE and FS are logically separate from the FEs.

A further embodiment is a network architecture, including a plurality of forwarding elements (FEs) and at least one feature server (FS). The FEs forward packets. Each FE is controlled by and receives routing information from at least one control element (CE). The FS implements at least one application and is in communication with the FEs and CE. The CE and FS are logically separate from the FEs.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

Figure 1:
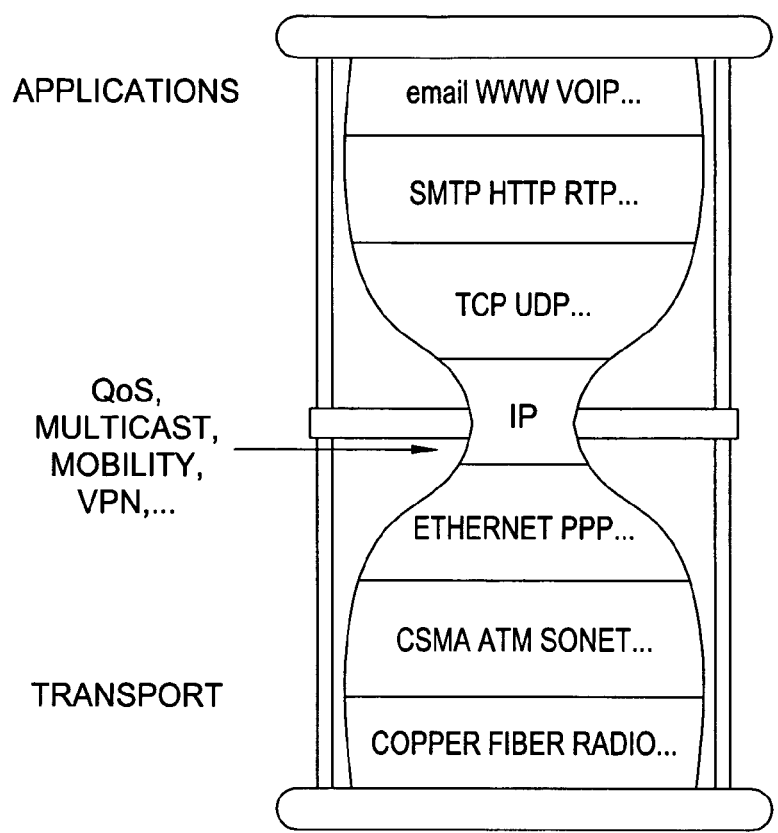
FIG. 1 illustrates that problem of emerging applications driving more functions to Internet protocol (IP)

The invention will be primarily described within the general context of an embodiment of an exemplary SoftRouter architecture, however, those skilled in the art and informed by the teachings herein will realize that the disaggregation concept may be used to generate various other embodiments of network architectures and that the invention is applicable to local area networks (LANs), metropolitan area networks (MANs), wide area networks (WANs), and other networks, many open systems interconnection (OSI) layers, gateway protocols, serial line protocols, protocol stack routing and bridging protocols, many other protocols, traffic management, optical, edge/core routing, wireless, cable, data centers, fault management, configuration management, accounting management, performance management, security management, other network management, enterprise, government, military applications, and many other different kinds of networking characteristics and applications.

IP is becoming the universal protocol for transport datagrams. Most applications ride on top of IP and IP can be implemented over many diverse link layer technologies.

Traditionally, the main function of the IP layer is packet forwarding. That is, when a packet is received at a router, the destination address in the IP packet is matched against a local forwarding table, this yields the output port to which the IP packet should be delivered. The entries in this local forwarding table are maintained by running some form of routing protocols. In the exemplary SoftRouter architecture, the routing protocols need not be run locally at the router, rather they can be run remotely on CEs and the changes in the entries can be communicated using some form of standardized protocols. This separation of forwarding and control allows the FEs to stay simple, while most of the intelligence and complexity is moved to the CEs.

As IP matures and grows, more and more features are being added to the IP layer. Some examples include: multicast, security (IPSec), monitoring, accounting, mobile IP, and VPN. Each of these feature additions typically requires additions to both the forwarding and control elements. For example, IP multicast requires an additional multicast forwarding table on the forwarding path and the use of new multicast routing protocols such as protocol independent multicast (PIM) for control.

In the exemplary SoftRouter architecture, additions to the IP layer mean addition of functions to a router as both forwarding and control are implemented in the same box. The feature server (FS) follows the basic disaggregation idea as discussed with respect to the exemplary SoftRouter architecture with one difference being that instead of disaggregating basic control, the FS is concerned with disaggregating the control as associated with the more advanced value-added features. The separation here is logical. That is, there is a well-defined interface between the different entities: FE, CE, and FS.

This interface can be implemented in many ways. For example, if an implementation integrates the FE and FS in the same physical platform, the interface can be implemented via a local inter-process communication or even a function call (if they are physically on the same processor). Or if an implementation physically disaggregates the FS in a remote physical box from the FE, then the interface can be implemented via a communication protocol.

In the exemplary SoftRouter architecture, disaggregation of router hardware from router software using open, standards-based protocols for internetworking has many benefits. The disaggregation concept decouples suppliers for each component, which lowers barriers to entry for hardware vendors and encourages independent software vendors (ISVs) to invest in developing carrier-class routing software to supply new hardware market entrants. This disaggregation concept allows each component to focus on its own innovation curve. Hardware manufacturers can focus on the highest speeds per density at the lowest costs, decreasing capital expenditures and software manufacturers can focus on new applications and manageability, increasing revenue while decreasing operating expenses.

An exemplary embodiment of an exemplary SoftRouter architecture is an approach to disaggregating the complex IP functions demanded by emerging applications. SoftRouter centralizes and allows sharing of complexity. SoftRouter enables scalable introduction of new functions without unduly encumbering IP forwarding functions.

Figure 2:
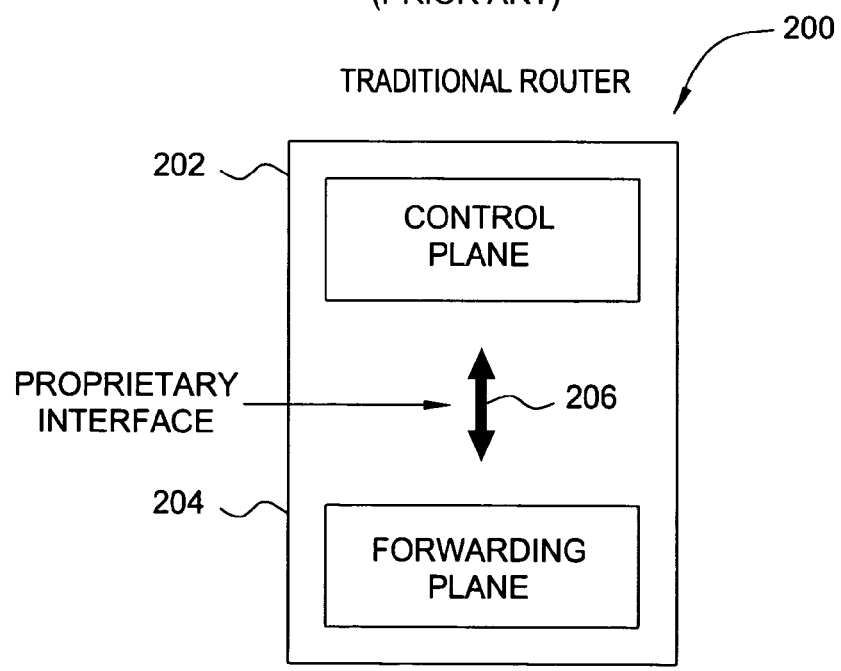
FIG. 2 is a block diagram showing a traditional router.

FIG. 2 shows a traditional router 200 having integrated control and transport planes. The traditional router 200 has software 202 and hardware 204 communicating through a proprietary interface 206.

Figure 3:
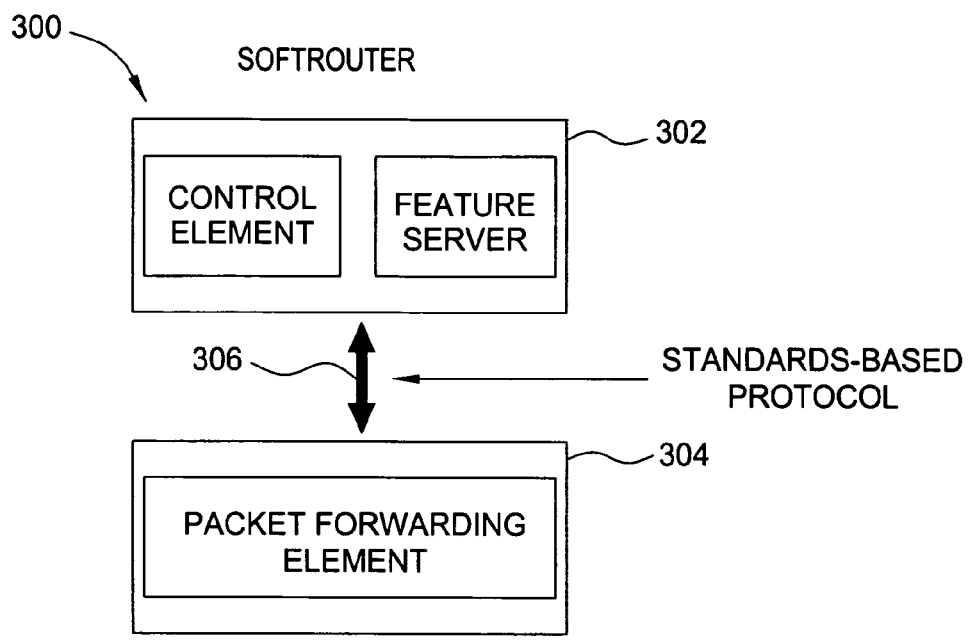
FIG. 3 is a block diagram showing a high level abstraction of an exemplary SoftRouter architecture.

By contrast, FIG. 3 shows a high level abstraction of this exemplary SoftRouter architecture 300 that disaggregates the control and transport planes in separate hardware that communicate using standard protocols. The SoftRouter architecture 300 has a control element and features server component 302 and a packet forwarding element component 304 that communicate using a standards-based protocol 306.

Figure 4:
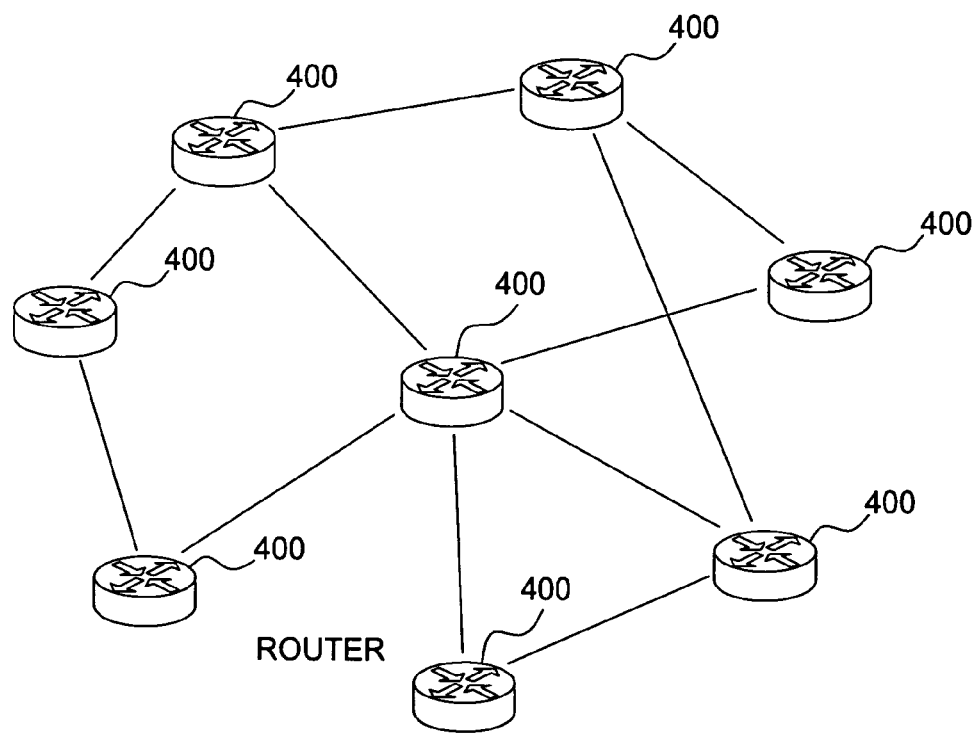
FIG. 4 is a block diagram showing a traditional router-based network.

FIG. 4 shows the traditional router architecture, which has a number of interconnected routers 400.

Figure 5:
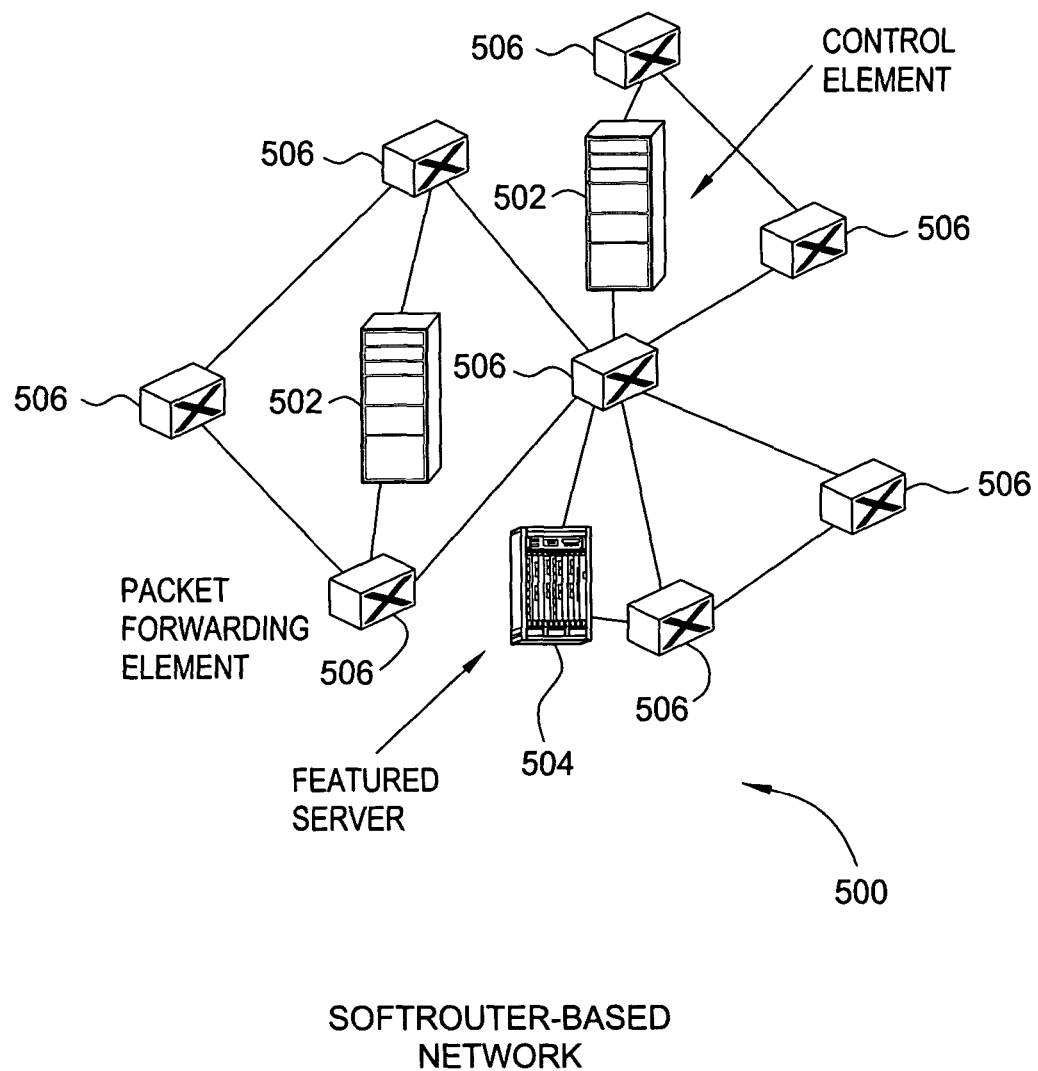
FIG. 5 is a block diagram showing one embodiment of a network based on the exemplary SoftRouter architecture.

FIG. 5 shows one embodiment of the exemplary SoftRouter architecture 500. In this exemplary SoftRouter architecture 500, the software servers include control elements (CEs) 502 and feature servers (FSs) 504. CEs 502 are responsible for traditional routing, e.g., for both interior gateway protocol (IGP) (e.g., open shortest path first (OSPF)) and exterior gateway protocol (EGP) (e.g., border gateway protocol (BGP)). FSs 504 are responsible for value-added functions and network-based applications, e.g., QoS, security, VPN, and mobile IP. Both CEs 502 and FSs 504 interface to forwarding elements (FEs) 506. CEs 502 and FSs 504 may have additional interfaces to each other. This exemplary SoftRouter architecture separates and centralizes the software-based route controller (as implemented in a CE and value-added functions as implemented in a FE) from the predominantly hardware-based transport and packet forwarding.

A FS 504 facilitates adding optional network-based functionality to an embodiment of the SoftRouter architecture in ways that scale better than the traditional router architectures. A FS 504 may have an application programming interface (API) allowing network-based functionality to be created by others. Some examples of network-based functionality include QoS support, scaling BGP route reflectors, network-based VPN support, scaling mobile IP support, introducing IPv6 into existing and future networks, end-to-end network security, and network monitoring (metering). Network-based functionality adds value to embodiments. Some allow service providers to charge fees for providing an optional service, such as QoS and security. The FS 504 hosts one or more applications of network-based functionality and the applications may be activated at a particular time. Because the FS 504 is centralized in the exemplary SoftRouter architecture, the FS 504 is able to provide an application for a number of users, clients, enterprises, and the like. For example, a FS 504 may host a particular service that enterprise A uses, but enterprise B does not use. A FS 504 may host a particular service that many enterprises use, but it only needs to be installed once at the FS 504 and not for each enterprise. Unlike the traditional router architecture, the FS 504 is not in each of the forwarding elements, but is in a control plane in the exemplary SoftRouter architecture.

There are many benefits to customers, including lower costs, new revenue opportunities, better scalability, added reliability, and increased security. Lower costs come from commoditized, standards-based hardware with a lower capital expense and dedicated control plane servers, implying fewer management points and a lower operational expense. There are new revenue opportunities, because network-based applications to support new services that are more easily added using open application programming interfaces (APIs) and incremental deployment is made simpler through centralized management. There is better scalability, because centralized control plane servers are easier to scale using well-established server scaling techniques. There is added reliability, because forwarding elements are more robust due to reduced software and other reliability enhancing mechanisms, (e.g., failover and overload control) that are easier to implement in the server-based control plane. There is increased security, because the centralized control plane servers are easier to secure using perimeter defense systems, e.g., firewalls.

Figure 6:
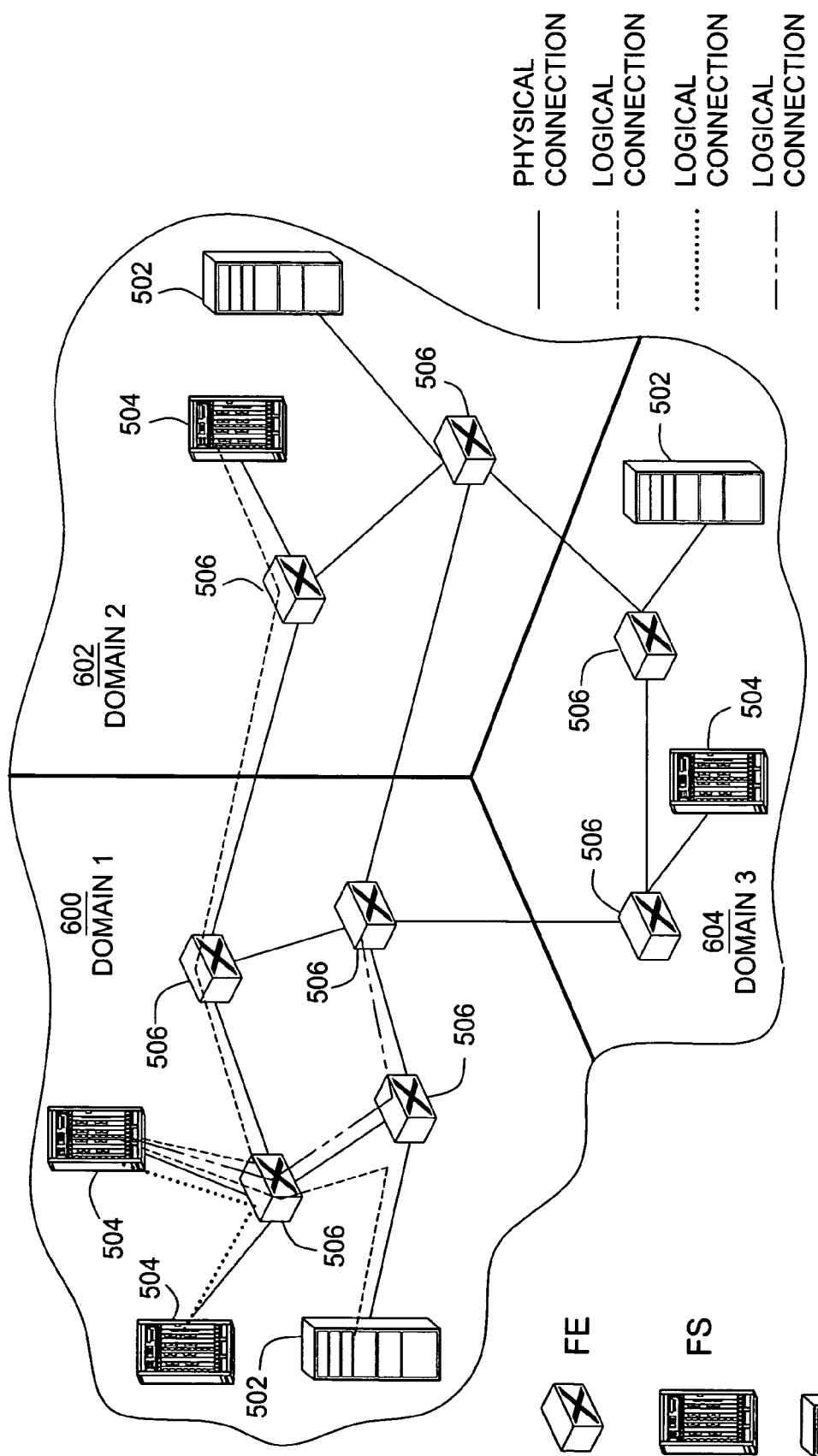
FIG. 6 is a block diagram showing an exemplary network having a feature server.

FIG. 6 shows an exemplary network having a feature server. This exemplary network is divided into three domains: domain 1 600, domain 2 602, and domain 3 604. In domain 1 600, there four FEs 506 connected to two FSs 504 and one CE 502. In domain 2 602, there are two FEs 506 connected to two of the FEs 506 in domain 1 and connected to a CE 502 and a FS 504. In domain 3 604, there are two FEs 506, one FE 506 connected to an FE 506 in domain 1 600 and another FE 506 connected to an FE 506 in domain 2 602. The two FEs 506 in domain 3 604 are also connected to an FS 504 and a CE 502.

The FSs 504 are not necessarily the same. Each FS 504 may be implementing different applications. The operation of a FS 504 may include interaction with one or more of FEs 506, CEs 502, and other FSs 504.

A FS 504 may interact with a FE 506. In one scenario, the FE 506 collects information from the forwarding path and sends the information to the FS 504 for processing. Examples of such information include protocol packets that are received the FE 506 or local information (e.g., packet count) gathered by the FE 506. Based on the result of its processing, a FS 504 can also send a command to a FE 506 to affect its action. For example, in a security application, the FS 504 installs a packet filter on the FE 506 so that packets matching the packet filer criteria are dropped.

A FS 504 may interact with a CE 502. For example, a FS 504 that is performing traffic engineering for a domain needs to have information about the routing topology of the network. In the exemplary SoftRouter architecture, the routing topology is maintained by CEs 502. In the reverse direction, if a FS 504 decides to change certain routes based on traffic engineering considerations, the FS 504 notifies a CE 502 of the route changes, which, in turn, propagates the route changes down to the FEs 504.

A FS 504 may interact with another FS 504 in the same domain or in a different domain. Depending on the applications, multiple FSs 504 in the same domain may need to work together. The relationship between the FSs 504 varies depending on the application. For some applications, the FSs 504 may work as peers in a completely distributed fashion and, for some other applications, the FSs 504 may work in a master-slave relationship, where a particular FS 504 acts as the master for the whole group. An application where a peer relationship exists between FSs 504 is a security monitoring. Each FS 504 controls a number of FEs 506 that have firewall capability and all FSs 504 cooperate to implement the control for the aggregate distributed firewall. Specifically, any traffic deemed undesirable is blocked in firewalls and the control is propagated through the distributed set of FSs 504. An application where a master-slave relationship exists between FSs 504 is traffic engineering. A number of FSs 504 serve to collect the current traffic usage information, but there is only a single path computation element (the master FS 504) that decides which changes to make.

Inter-domain FSs 504 interactions also vary depending on the application, but, typically, the FS 504 interaction is more of the peer-to-peer nature. One use of inter-domain FS interaction is to implement a value-added protocol that has been agreed on by a confederation of service providers (domains). In this way, a new feature is deployed incrementally first among only a small set of providers. New providers join in by simply deploying the needed feature on its FS 504. An example of this is specialized routing for selected applications. For example, if a confederation of service providers agrees to specialized routing performed for VOIP traffic for voice quality reasons, then the service providers deploy the new VOIP traffic routing protocol on their respective FSs 504. The FSs 504 then cooperate among themselves to compute the best route for VOIP traffic.

Another exemplary embodiment of the SoftRouter architecture includes FEs 506 for switching, a SoftRouter having CEs 502 for layer 3 control and FSs 504 and applications for VPN and other application support. This exemplary SoftRouter architecture has many applications, including IP routing and data over optical, such as voice over IP (VOIP) and IP video.

Figure 7:
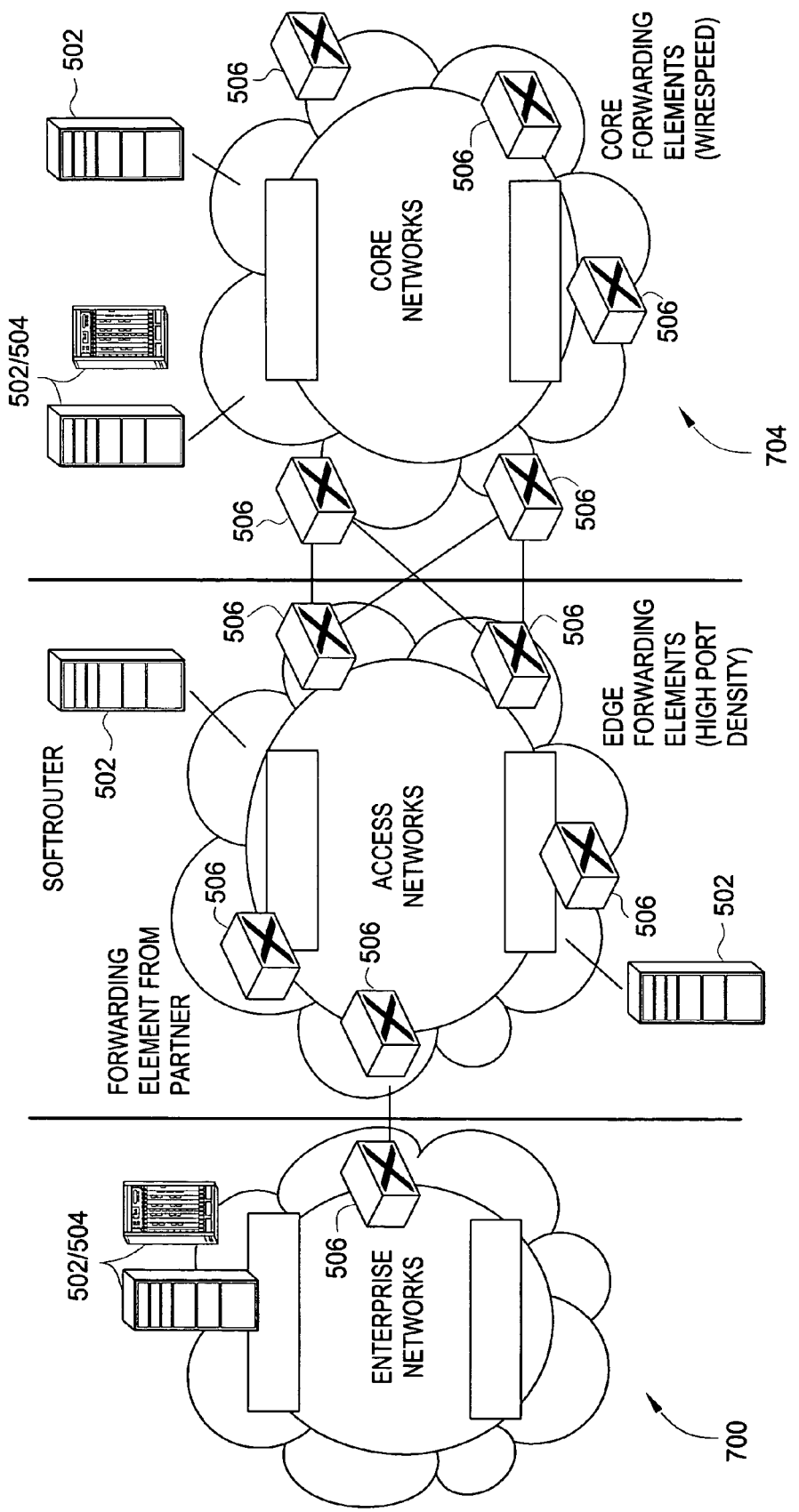
FIG. 7 is a block diagram showing an IP routing application of an embodiment of the exemplary SoftRouter architecture.

FIG. 7 shows an IP routing application of an embodiment of this exemplary SoftRouter architecture. This exemplary SoftRouter architecture can be applied to enterprise 700, access 702, and core 704 networks.

Figure 8:
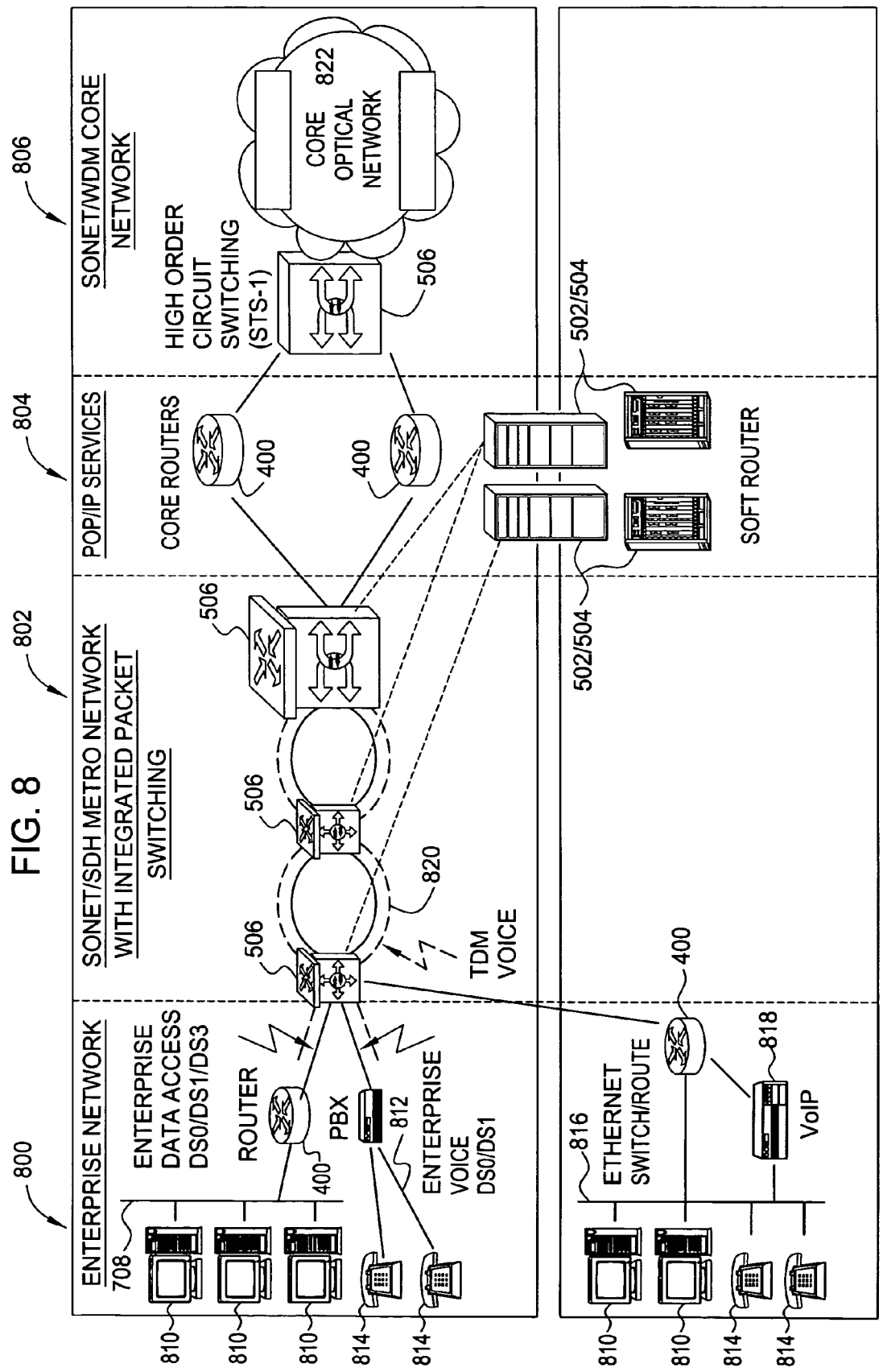
FIG. 8 is a block diagram showing a data over optical application of an embodiment of this exemplary SoftRouter architecture.

FIG. 8 shows a data over optical application of an embodiment of this exemplary SoftRouter architecture. In FIG. 8, there is an enterprise network 800, a SONET/synchronous digital hierarchy (SDH) metro network 802 with integrated packet switching, point of presence (POP)/IP services 804, and a SONET/wavelength division multiplexing (WDM) core network 806, which are interconnected.

In the enterprise network 800, there is enterprise data access 808 for a number of computers 810 via a router 400 at digital signal, level 1 (DS0)/digital signal, level 1 (DS1)/digital signal, level 3 (DS3). There is enterprise voice 812 for a number of telephones 814 via a private branch exchange (PBX) switchboard at DS0/DS1. The router 400 and PBX switchboard are connected to the SONET/SDH metro network 802.

In the enterprise network 800, there is another Ethernet switch/route 816 and router 400 connecting more computers 810 and telephones 814 with VOIP device 818. The router 400 and VOIP device 818 are also connected to the SONET/SDH metro network 802.

In the SONET/SDH metro network 802, there is time-division multiplexing (TDM) of voice 820 from the enterprise network 800 over a network of FEs 506, which are connected to a SoftRouter having CEs 502 and/or FSs 504. The SONET/SDH metro network 802 is connected to POP/IP services 804.

In the POP/IP services 804, there is a network of core routers 400. The POP/IP services 804 are connected to the SONET/WDM core network 806.

In the SONET/WDM core network 806, there is high order circuit switching (synchronous transport signal, level 1 (STS-1)) to a core optical network 822.

Some embodiments of this data over optical application include Ethernet interfaces and switching and provisioned multiprotocol label switching (MPLS) for pseudo-wire emulation (PWE).

There are many benefits of this data over optical application of the exemplary SoftRouter architecture, including lower management cost, more robust control plane, and higher element reliability. This is because the control plane software is located in POPs, not distributed info individual optical boxes. This application allows incremental deployment of data capability. Control servers can be incrementally deployed as data capability is incrementally added.

An embodiment of the exemplary SoftRouter architecture uses SoftRouter protocol and other protocols among the different SoftRouter elements. If the SoftRouter protocol becomes standardized, vendors can produce commoditized FEs 506 or open their existing boxes to support the SoftRouter protocol. ISVs can produce software for incorporation into CEs 502 and FSs 504. An ecosystem of FEs 506, CEs 502, and FSs 504 can be created to allow service providers to mix and match network elements.

FSs 504 can provide many different network-based functions and services to next generation networks. For example, enhancing QoS support, scaling BGP route reflectors, network-based VPN support, scaling mobile IP support, introducing IPv6 into existing and future networks, and enhancing end-to-end network security.

Figure 9:
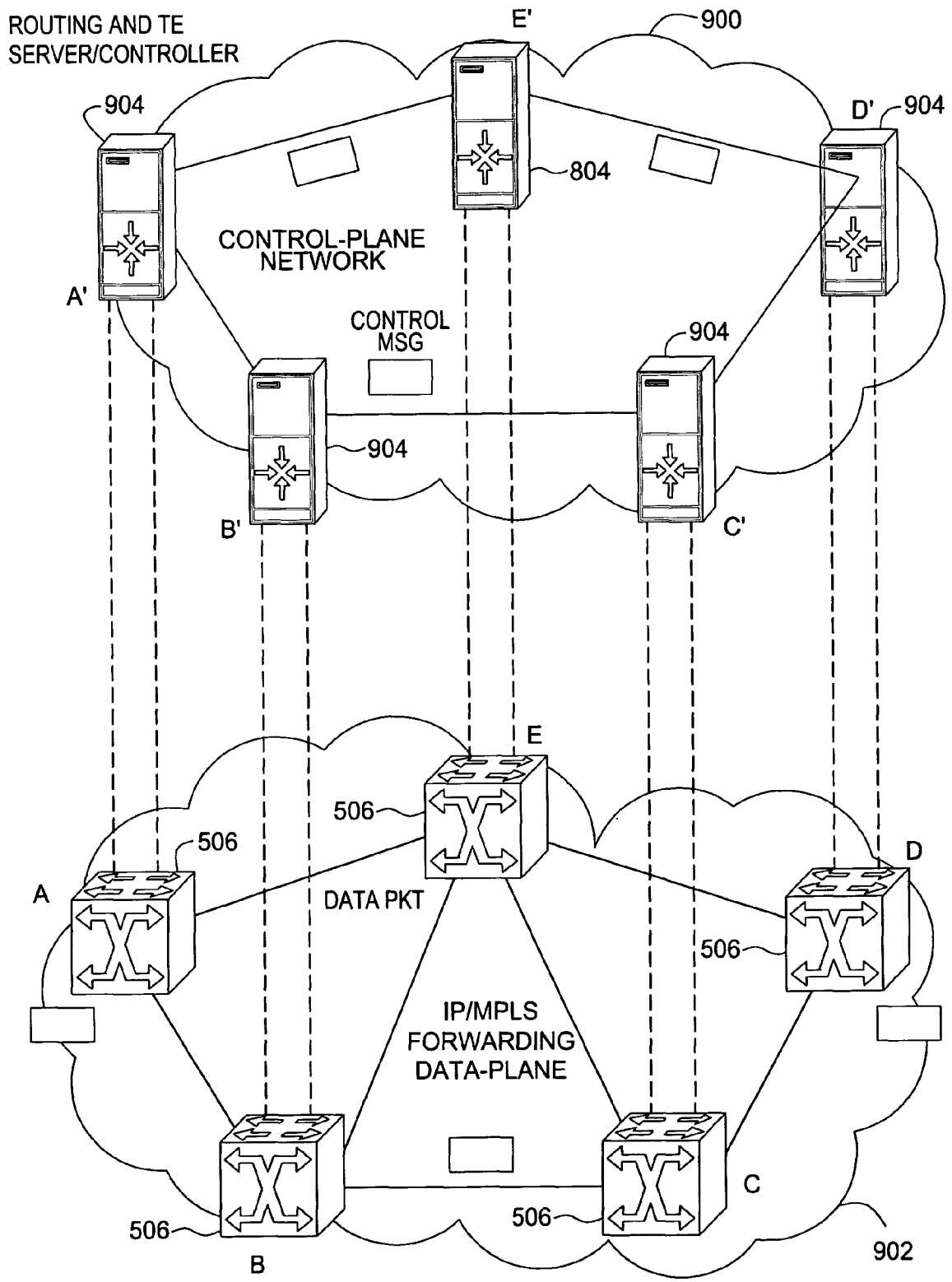
FIG. 9 is a block diagram showing quality of service (QoS) support by an embodiment of the exemplary SoftRouter architecture.

FIG. 9 shows QoS support by an embodiment of the exemplary SoftRouter architecture. There is a control plane network 900 that is separate from the IP/MPLS forwarding data plane 902. In the control plane network 900, a number of routing and TE servers/controllers 904, which are labeled A', B', C', D', and E', form a network. In the IP/MPLS forwarding data plane 902, data packets are routed based on data plane topology information and traffic engineered paths. The IP/MPLS forwarding data plane 902 includes a number of FEs 506, labeled A, B, C, D, and E, in a network. Although FIG. 9 shows the same number of TE servers/controllers 904 (e.g., CEs 502 and FSs 504) as FEs 506, preferably, there are less elements in the control plane network 900 than in the data plane network 902, such as a 1:10 ratio where 1 CE 502 controls 10 FEs and 1 FS 504 serves applications to the 10 FEs.

The exemplary SoftRouter architecture shown in FIG. 9 has many benefits for QoS and traffic engineering (TE). TE needs accurate link state monitoring. TE and QoS routing computations are more computationally intensive than the shortest path computations of OSPF. The computational needs for QoS and TE are easier to meet with a server-based implementation. The server-based implementation is within the framework of a distributed IP routing model, but more efficient QoS routing is enabled due to scalable processing power. QoS guarantees will be needed for VOIP. Disaggregated architecture within a QoS and TE server is able to meet this need.

When TE is being performed, the CE 502 computes basic routes (e.g., shortest path based on hop count) for FEs 506, the FS 504 gathers information about FEs 506 (e.g., receiving information about the current topology of the network(s) from the CEs 502) and determines traffic conditions at each link, and, then, the FS 504 re-computes QoS routes for select traffic based on actual traffic conditions and passes the QoS routing information to the FEs 506. Typically, not all traffic requires QoS, so the FS 504 usually computes QoS routes only for select traffic (QoS sensitive traffic), such as VOIP calls where voice samples need to be sent within a very short period of time. Given the routing information, each FE 506 determines which traffic needs a QoS route (from the FS 504) and which traffic needs a basic route (from the CE 502).

Figure 10A:
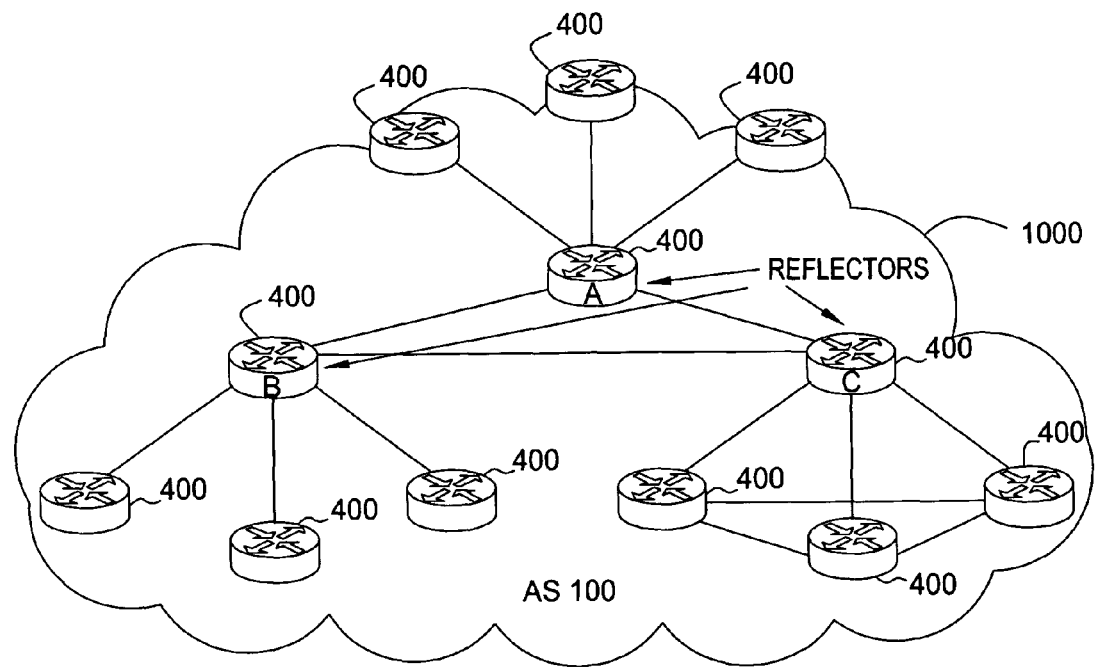
FIG. 10A is a block diagram showing a network with route reflectors 900 in the prior art.

FIG. 10A shows a network with route reflectors 1000 in the prior art, where some routers 400 are designated as reflectors 1002. In the traditional router architecture, BGP route reflection is done within routers 400 that have integrated control and forwarding functions.

Figure 10B:
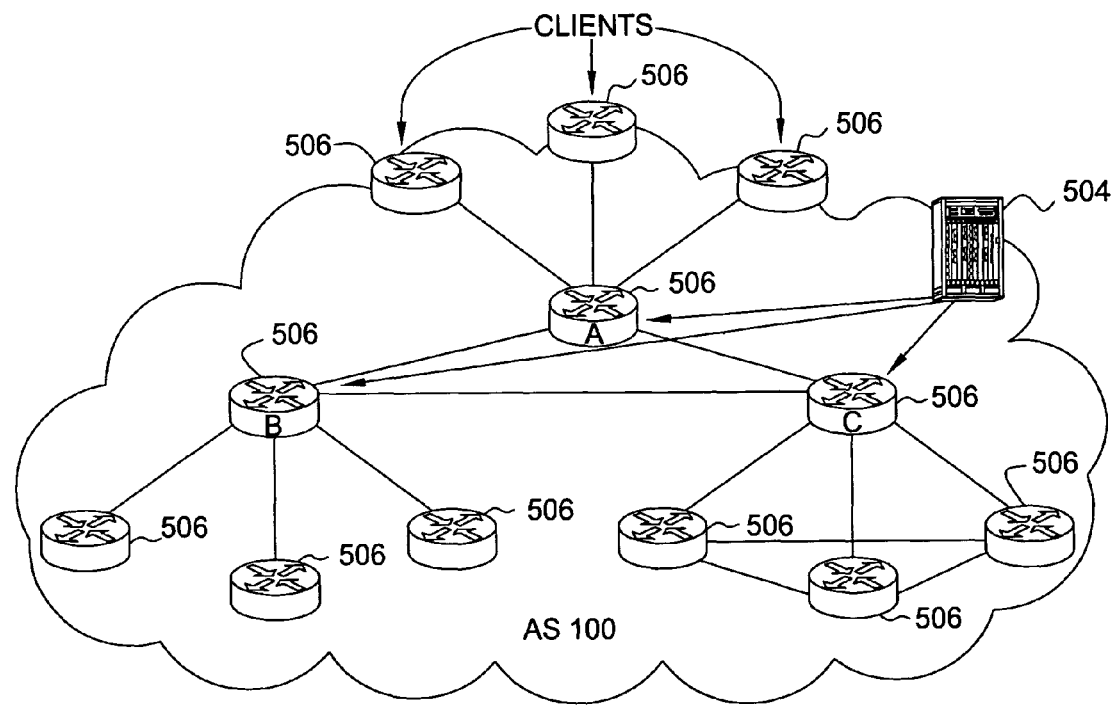
FIG. 10B is a block diagram showing scaling border gateway protocol (BGP) route reflectors for an embodiment of the exemplary SoftRouter architecture.

FIG. 10B shows scaling BGP route reflectors for an embodiment of the exemplary SoftRouter architecture. FIG. 10B shows a server-based implementation of route reflectors, where route reflectors are hosted on the FS 504. The concept of FSs 504 allows the BGP route reflection function to be hosted on a FS 504 without incurring the total cost of a traditional router 400 that has functionality that is not needed.

Route reflectors are used to handle scalability problems due to a large number of BGP sessions. The server-based implementation shown in FIG. 10B has benefits of attack resilience, higher processing capacities; easier handling of higher loads caused by BGP/MPLS VPNs, and is an extension of route reflector architecture. The FS 504 can also be used as a BGP service assurance platform, providing connectivity assurance, privacy assurance, and overload detection and control.

Figure 11:
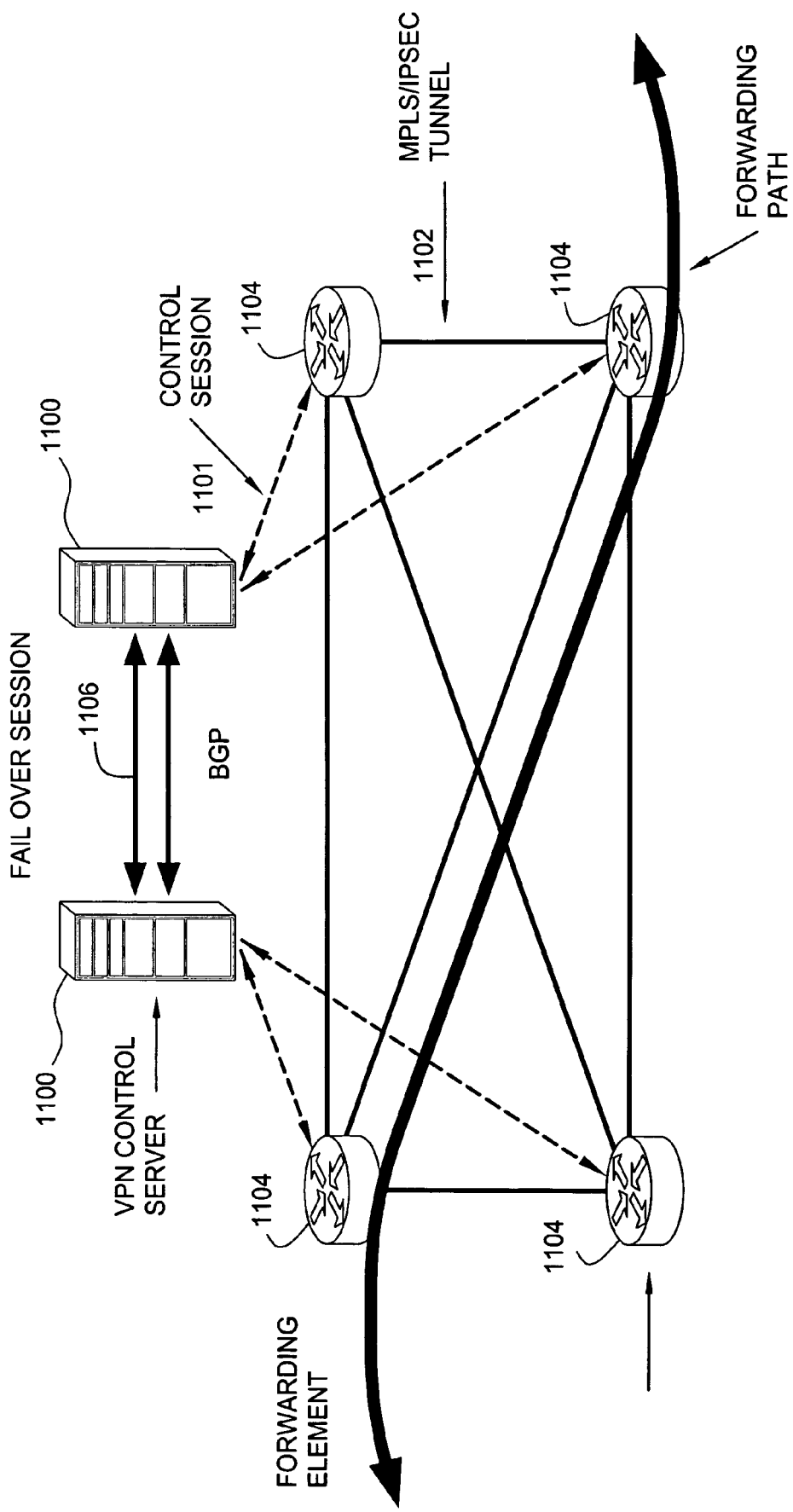
FIG. 11 is a block diagram showing network-based virtual private network (VPN) support and server-based BGP/multiprotocol label switching (MPLS) VPNs, according to an embodiment of the exemplary SoftRouter architecture.

FIG. 11 shows network-based VPN support and server-based BGP/MPLS VPNs according to an embodiment of the exemplary SoftRouter architecture. A VPN control server 1100 uses a control session 1101 to create MPLS or IP security (IPSec) tunnels 1102 among provider edge (PE) routers 1104, which are simple FEs 506. MPLS tunnels 1102 can be traffic engineered to meet VPN customer requirements. The VPN control server 1100 injects routes in the FEs 506. Failover sessions 1106 among VPN control servers 1100 make sure that in the event of server failure, the other server takes control over effected FEs 506. Server upgrades do not impact the network operation, permitting easier upgrades.

The concept of FSs 504 allows the VPN support to be hosted on a FS 504, as opposed to VPN support being in each traditional router 400. Using FSs 504 in the exemplary SoftRouter architecture scales better, because the FS is centralized allowing it to manage resources better. Centralizing logic, such as VPN support in only a few places also reduces complexity and saves time installing, maintaining, etc. the logic.

Figure 12:
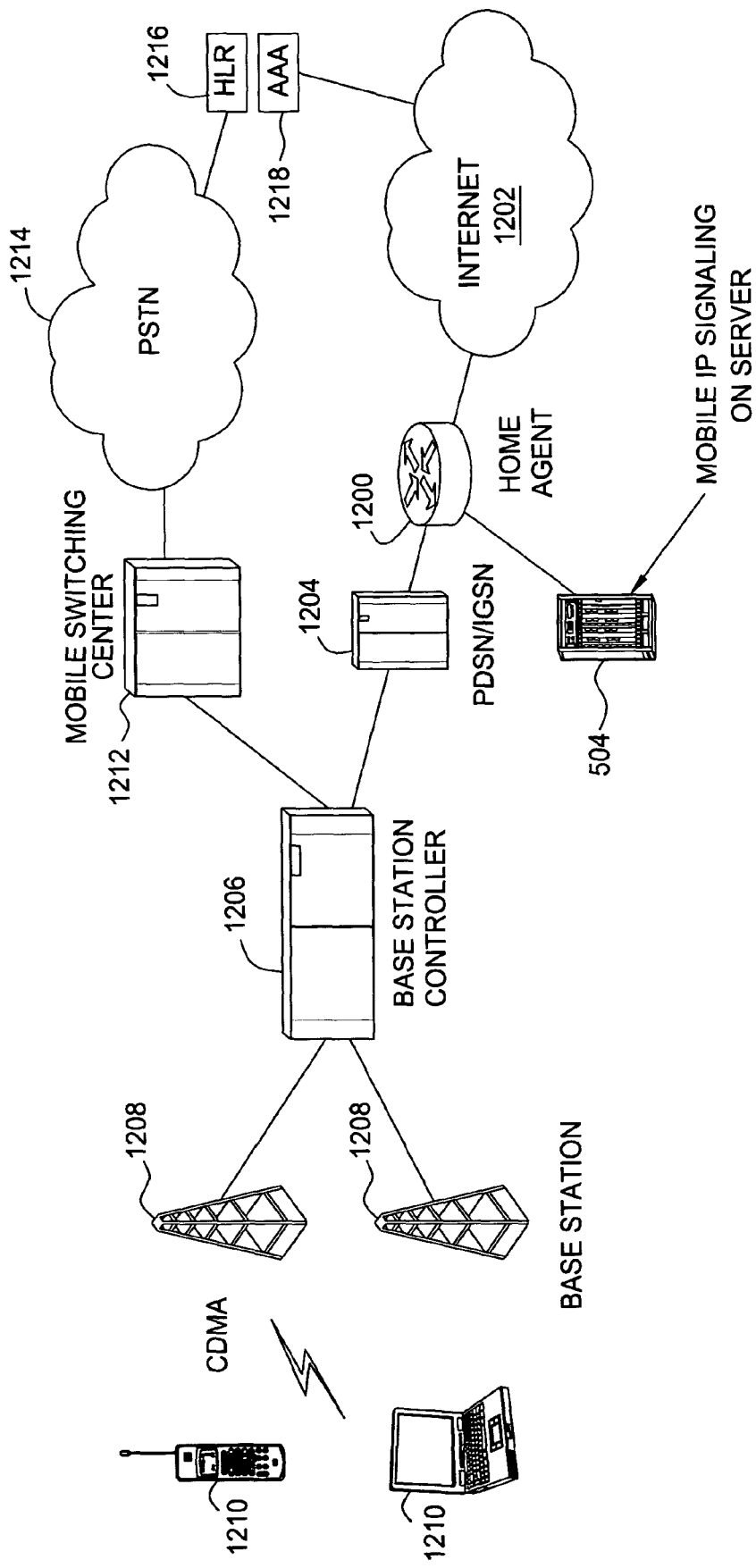
FIG. 12 is a block diagram showing scaling mobile IP, according to an embodiment of the exemplary SoftRouter architecture.

FIG. 12 shows scaling mobile IP according to an embodiment of the exemplary SoftRouter architecture. Mobile IP home agent 1200 will require increasing scalability as cellular carriers introduce wireless data. The mobile IP home agent 1200 is connected to the Internet 1202, premise distribution system network (PDSN)/Internet general packet radio service (GPRS) support node (IGSN) 1204, and a FS 504 that performs mobile IP signaling. The PDSN/IGSN 1204 is connected to a base station controller 1206. The base station controller 1206 is connected to base stations 1208 that communicate with wireless devices 1210 by code division multiple access (CDMA). The base station is also connected to a mobile switching center 1212, which is connected to the public switched telephone network (PSTN) 1214. The PSTN is connected to a home location register (HLR) 1216. The Internet 1202 is connected to an authentication, authorization, and accounting (AAA) server 1218. Offloading mobile IP functionality to FSs 504 in the exemplary SoftRouter architecture scales better than the traditional router architecture.

There are two approaches to scalability of mobile IP in the prior art, one for routers and another for servers. Routers in the prior art support home agents where signaling it limited to about 100 bindings/second, i.e. supporting less than about 1 updates per hour per user. Servers in the prior art have mobile IP implementation in cluster processors, but scaling the number of home agents is an issue, because IPSec processing is CPU intensive.

By contrast, the disaggregated exemplary SoftRouter architecture allows server-based signaling, while retaining hardware-based transport scalability. Transport is handled by FEs 506 with hardware support for IPSec that can support about a million home agents. Signaling capacity can be scaled using multiple blade servers, thus enabling about 60 updates/hour/mobile user or more.

Figure 13:
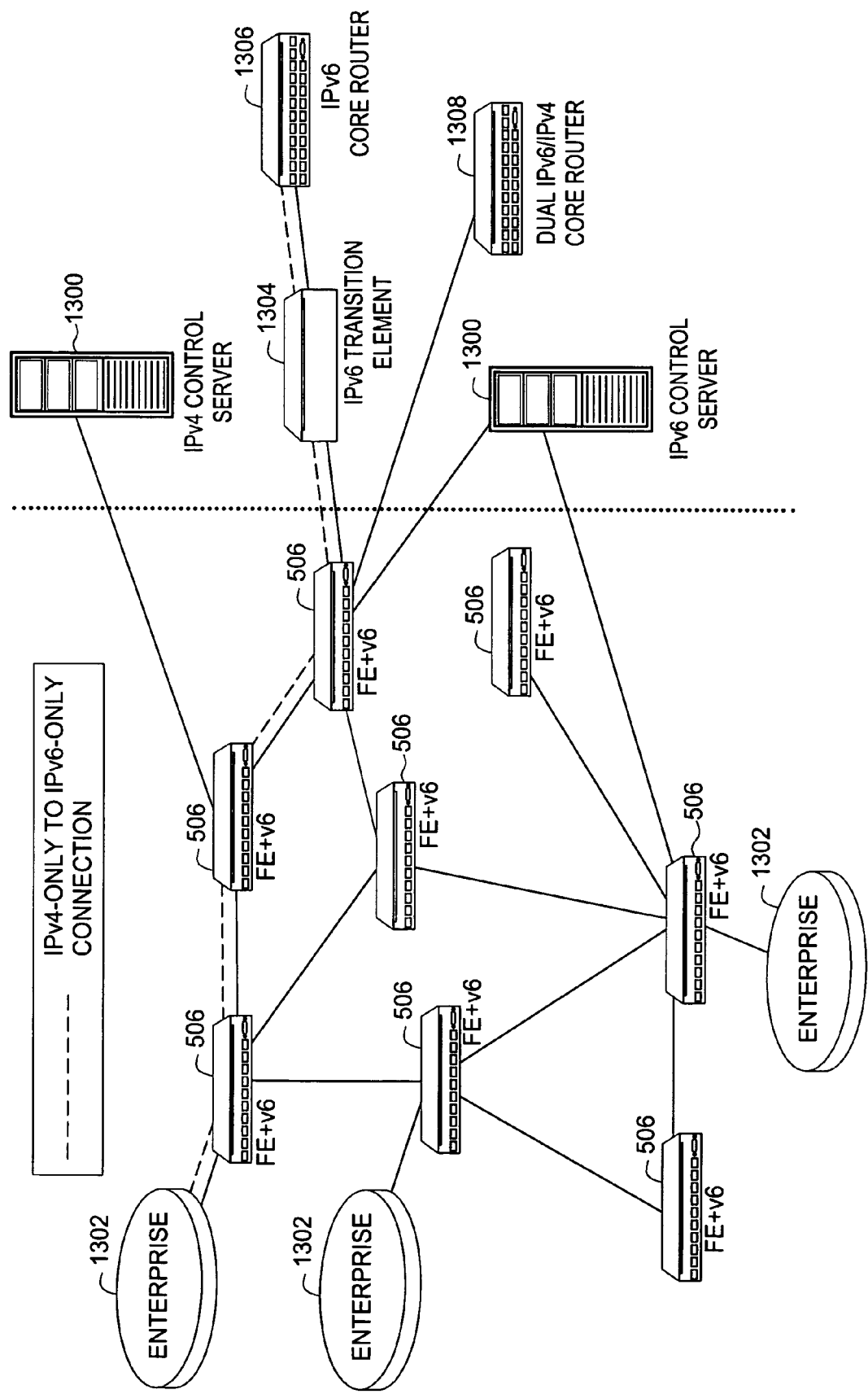
FIG. 13 is a block diagram showing IPv6, according to an embodiment of the exemplary SoftRouter architecture.

FIG. 13 shows IPv6, according to an embodiment of the exemplary SoftRouter architecture. In FIG. 13, a network includes an IPv6 control server 1300, a number of FEs 506, enterprises 1302, an IPv6 transition element 1304, an IPv6 core router 1306, and a dual IPv6/IPv4 core router.

Transport organizations can support Ipv6 in a SoftRouter network by adding the IPv6 control server 1300. The IPv6 control server 1300 need only be introduced when an organization chooses to move to IPv6. The disaggregation of the exemplary SoftRouter architecture lends itself to incremental transitioning to IPv6. There is a low cost initial outlay for IPv6 future proofing that is required and transitioning resources are added on a pay-as-you-go basis.

The exemplary SoftRouter architecture including a FS enables a three-stage deployment for IPv6, in one example. Stage one is future proofing FEs 506. Basic IPv6 functionality is included in FEs 506, which is initially disabled. This IPv6 functionality includes standard IPv6 packet routing, IPv6-in-IPv4 or IPv6-in-MPLS tunneling, support to set a default route to the tunneled IPv6 control server 1300 (deployed in a later stage), and IPv6 flow label to MPLS mapping. There is a low cost to implement these functions.

Stage two is providing cut-through IPv6 services only. Global IPv6 services cut through the IPv4 core network. An IPv6 control server 1300 is added to provide: address management (proxy auto-configuration or dynamic host configuration protocol, version six (DHCPv6), tunnel configuration of FEs 506, MPLS path set-up for end-user QoS-specified connections, and domain naming system (DNS), DHCPv6 forwarding.

Stage three is full dual IPv6/IPv4 services. IPv6 transition elements (e.g., network address translation-protocol translation (NAT-PT), 6to4Relay) and required extensions to IPv6 are added. The IPv6 control server 1300 supports all forms of IPv6 and IPv4 inter-working. There is support for IPv6-only to IPv4-only communications and dynamic routing and load balancing to gateway elements, and routing protocol peering (e.g., OSPFv3, BGP4+).

Upgrading service is easier to perform using an FS 504 (e.g., IPv6 control server 1300) in an embodiment of the exemplary SoftRouter architecture, than in the traditional router architecture. An FE 506 can be upgraded first without implementing the control. This cannot be done as well in the traditional router architecture where everything has to be upgraded at the same time. Later on, the control can be turned on. The control may even be turned on individually for different FEs 506.

Another application facilitated by FSs 504 is network monitoring, e.g., tracing packets and storing filters. Network monitoring is like a metering function where FEs 506 collect and forward information to the FS 504.

Figure 14:
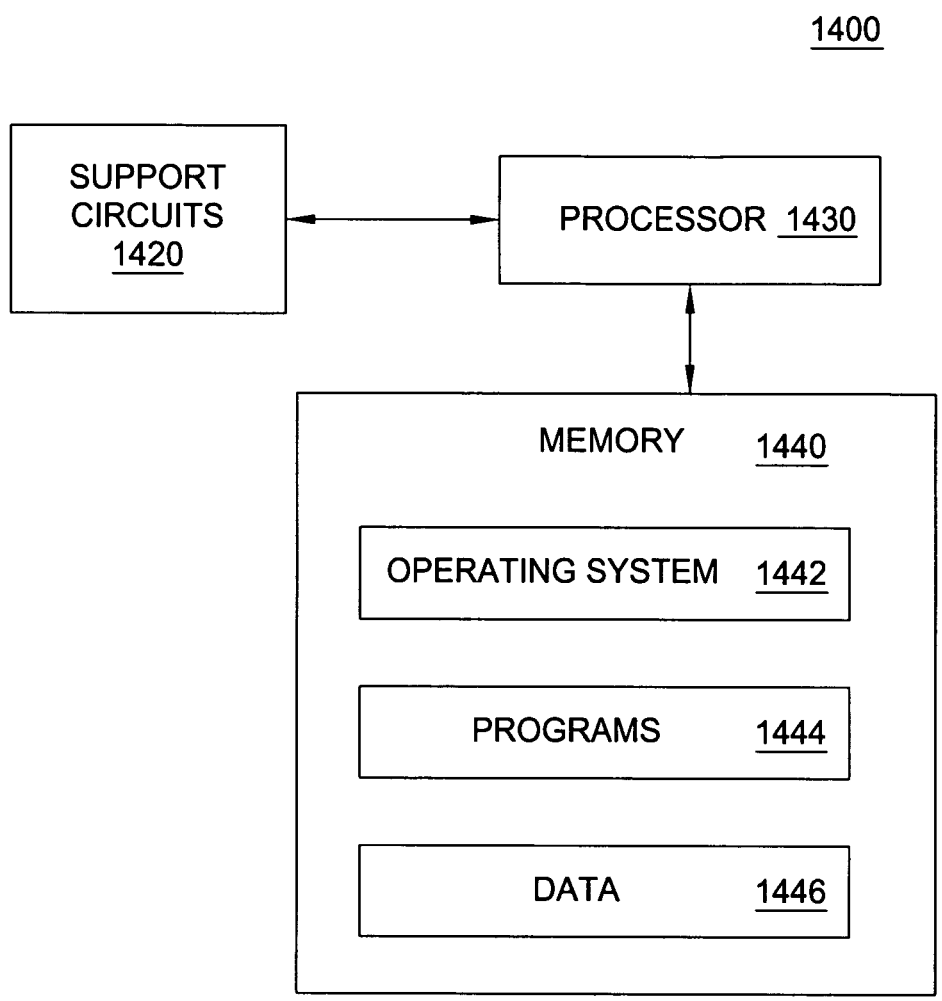
FIG. 14 is a high level block diagram showing a computer.

FIG. 14 is a high level block diagram showing a computer. The computer 1400 may be employed to implement embodiments of the present invention. The computer 1400 comprises a processor 1430 as well as memory 1440 for storing various programs 1444 and data 1446. The memory 1440 may also store an operating system 1442 supporting the programs 1444.

The processor 1430 cooperates with conventional support circuitry such as power supplies, clock circuits, cache memory and the like as well as circuits that assist in executing the software routines stored in the memory 1440. As such, it is contemplated that some of the steps discussed herein as software methods may be implemented within hardware, for example, as circuitry that cooperates with the processor 1430 to perform various method steps. The computer 1400 also contains input/output (I/O) circuitry that forms an interface between the various functional elements communicating with the computer 1400.

Although the computer 1400 is depicted as a general purpose computer that is programmed to perform various functions in accordance with the present invention, the invention can be implemented in hardware as, for example, an application specific integrated circuit (ASIC) or field programmable gate array (FPGA). As such, the process steps described herein are intended to be broadly interpreted as being equivalently performed by software, hardware, or a combination thereof.

The present invention may be implemented as a computer program product wherein computer instructions, when processed by a computer, adapt the operation of the computer such that the methods and/or techniques of the present invention are invoked or otherwise provided. Instructions for invoking the inventive methods may be stored in fixed or removable media, transmitted via a data stream in a broadcast media or other signal bearing medium, and/or stored within a working memory within a computing device operating according to the instructions.

The present invention has many advantages. SoftRouter FSs 504 remove complexity from routers, allow functions to be implemented on a standard-off-the-shelf server platform, facilitate easy introduction of value-added functions, and scale well.

FSs 504 remove complexity from routers by extracting the complex logic for implemented value-added network-based functions from individual routers. As a result, the complexity of each individual router is significantly decreased. This, in turn, improves reliability, manageability, and security of the entire network.

FSs 504 allows functions to be implemented on a standard-off-the-shelf server platform. This decreases the capital expenditure (capex) cost for the control plane. With complexity removed from the forwarding plane, capex cost for each forwarding element is substantially lower than that of a traditional router. Disaggregation also opens up the market place for increased competition, new players may provide the different components, and this increased competition will drive down costs.

FSs 504 facilitate easy introduction of value-added functions. Deployment and management effort is mostly focused on the FS 504, and not all the individual FEs 506. Also, with an open API available on the FS 504, new independent software vendors may produce a diverse set of new third-party applications for hosting on a FS 504. This has the potential of significantly accelerating innovations.

FSs 504 scale well. FSs scale much easier as needed than a traditional embedded implementation of new network functions in a router. Standard server techniques can be applied. This ease of scaling also allows incremental deployment. As demand for the value-added service increases, more feature server capacity (e.g., adding processing power to an existing FS or adding new FSs) can be added on an as-needed basis.

While the foregoing is directed to various embodiments of the present invention, other and further embodiments of the invention may be devised without departing from the basic scope thereof. As such, the appropriate scope of the invention is to be determined according to the claims, which follow.

What is claimed is:

1. A computer network, comprising:
   a plurality of forwarding elements (FEs) for packet forwarding;
   at least one control element (CE) in communication with at least two of the FEs for controlling and providing routing information to the FEs; and
   at least one feature server (FS) for implementing at least one application, the at least one FS being centralized in a control plane and in communication with the FEs and the CE;
   wherein the at least one CE and the at least one and FS are logically separate from the FEs.

2. The computer network of claim 1, wherein a particular FE of the FEs collects information from a forwarding path and sends the information to the at least one FS for processing.

3. The computer network of claim 2, wherein, based on the processing, the at least one FS sends a command to the particular FE to affect an action.

4. The computer network of claim 3, wherein the application is a security application and the at least one FS installs a packet filter on the particular FE.

5. The computer network of claim 1, wherein the application is traffic engineering, the at least one FS notifies the at least one CE of a routing change, and the at least one CE propagating the routing change to the FEs.

6. The computer network of claim 1, wherein the at least one FS, the at least one CE, and the FEs are in a first domain and further comprising at least one additional FS in a second domain, at least one additional CE in the second domain, and a plurality of additional FEs in the second domain.

7. The computer network of claim 6, further comprising a further plurality of FSs, the relationship between the FSs being peer-to-peer.

8. The computer network of claim 6, further comprising a further plurality of FSs, the relationship between the FSs being master-slave.

9. The computer network of claim 6, further comprising a further plurality of FSs, the relationship between the FSs being application-specific.

10. The computer network of claim 9, wherein the application is security monitoring and the relationship between the FSs being peer-to-peer.

11. The computer network of claim 9, wherein the application is traffic engineering and the relationship between the FSs being master-slave.

12. The computer network of claim 9, wherein a particular FS in the first domain and a particular FS in the second domain are in a peer-to-peer relationship.

13. The computer network of claim 12, wherein the application is a voice over IP.

14. A computer network, comprising:
    a data plane including a plurality of forwarding elements (FEs) for packet forwarding;
    at least one control element (CE) for configuring, controlling, and providing routing information to at least two of the FEs via a standard protocol, the at least one CE being dynamically bound to the FEs;
    at least one feature server (FS) for adding network-based functionality, the at least one FS being centralized in a control plane; and
    a control plane that is logically separate from the data plane, the control plane including the at least one CE and the at least one FS.

15. The computer network of claim 14, wherein the control plane is physically separate from the data plane.

16. The computer network of claim 14, wherein the at least one FS includes an application programming interface (API).

17. The computer network of claim 14, wherein the network-based functionality is a quality of service (QoS) support.

18. The computer network of claim 14, wherein the network-based functionality is scaling BGP route reflectors.

19. The computer network of claim 14, wherein the network-based functionality is a VPN support.

20. The computer network of claim 14, wherein the network-based functionality is a voice over IP.

21. The computer network of claim 14, wherein the network-based functionality is a scaling mobile IP support.

22. The computer network of claim 14, wherein the network-based functionality is an upgrading IPv6 service.

23. The computer network of claim 14, wherein the network-based functionality is an end-to-end network security.

24. A computer network, comprising:
    at least one control element (CE) for controlling and providing routing information to a plurality of forwarding elements (FEs), the FEs to forward packets; and
    at least one feature server (FS) for implementing at least one application, the at least one FS being centralized in a control plane and in communication with the FEs and the at least one CE;
    wherein the at least one CE and FS are logically separate from the FEs.

25. A computer network, comprising:
    a plurality of forwarding elements (FEs) for packet forwarding, at least two FEs being controlled by and receiving routing information from at least one control element (CE), the FE in communication with at least one feature server (FS) for implementing at least one application, the FS being centralized in a control plane;
    wherein the FEs are logically separate from the at least one CE and the at least one FS.

* * * * *